United States Patent Office 3,803,197
Patented Apr. 9, 1974

---

3,803,197
METHOD OF PREPARATION OF ALKYL AND 2-ALKOXY-ETHYL SILICATES
Amos R. Anderson and Townsend H. Porter, Adrian, Mich., assignors to Anderson Development Company, Lenawee, Mich.
No Drawing. Continuation-in-part of abandoned application Ser. No. 140,257, May 4, 1971. This application July 13, 1972, Ser. No. 271,482
Int. Cl. C07f 7/04
U.S. Cl. 260—448.8 A                              9 Claims

ABSTRACT OF THE DISCLOSURE

Alkyl and 2-alkoxy-ethyl orthosilicates are prepared by reacting a simple alcohol or a 2-alkoxy-ethyl alcohol with silicon in contact with a catalytic amount of an alkali metal derivative of a 2-alkoxy-ethyl alcohol at atmospheric pressure and at temperatures of about 120° to 250° C., perferably 150° to 220° C. The preparation is performed preferably in the presence of a solvent.

CROSS-REFERENCE TO RELATED APPLICATION

This application is a continuation-in-part of United States patent application Ser. No. 140,257, filed May 4, 1971, now abandoned.

BACKGROUND OF THE INVENTION

Aliphatic organic orthosilicates have been prepared heretofore primarily by the reaction of alcohols with silicon tetrachloride. This technique has worked both with simple alcohols and with hydrocarbon either alcohols such as the alkoxyethyl alcohols, also known as alkoxyglycols. However, this method produces substantial quantities of hydrogen chloride which at best is unpleasant to work with and to dispose of. Consequently, whenever aliphatic organic orthosilicates have been needed, it has been found preferable to employ an ester interchange with an alkyl orthosilicate in which the alcohol corresponding to the alkyl group of the orthosilicate has a lower boiling point than the alcohol of the alkyl group to be introduced into the orthosilicate.

Efforts have also been made to develop a direct process for reacting alcohols with silicon to form the corresponding orthosilicate. For example, French Pat. No. 1,584,822 not only discusses several previously known methods for preparing alkyl orthosilicates but teaches the reaction of methanol with silicon or ferrosilicon or the like with an alkaline catalyst, preferably sodium methylate. The process operates at temperatures in the range of 70° C. to 100° C. at normal pressures and is limited to the production of methyl orthosilicate. French Pat. No. 2,007,690 expands on this method by the use of any alkali metal methoxide. The corresponding U.S. patent appears to be U.S. 3,557,179.

French Pat. No. 2,015,846 teaches the preparation of alkyl orthosilicates by the reaction of low molecular weight alkanols with silicon catalyzed by the corresponding sodium alkoxide in the presence of a sufficient amount of the corresponding alkyl orthosilicate to represent 80 to 90 weight percent of the total reaction mixture. The corresponding U.S. patent appears to be U.S. 3,627,807. Other references of interest include U.S. 2,927,937 and U.S. 3,232,972.

SUMMARY OF THE INVENTION

This invention is a method of making alkyl and/or 2-alkoxy-ethyl orthosilicates by reacting an alcohol ROH and/or an alkoxyethyl alcohol ROCH$_2$CH$_2$OH, in which each R is an alkyl group containing one to four carbon atoms, with silicon in contact with a catalyst of the formula R'OCH$_2$CH$_2$OM, in which M is an alkali metal atom, preferably lithium, sodium or potassium and R' is an alkyl group containing one to four carbon atoms, at a temperature of from about 120° C. to 250° C., preferably from about 150° C. to about 220° C. The silicon can be elemental or can be combined with one or more other metals in an alloy or chemical compound, but the silicon component is preferably powdered to an average particle size of 10 to 100 microns. Preferably, the average particle size is less than 75 micron.

DESCRIPTION OF THE PREFERRED EMBODIMENTS

The simple alcohols ROH which can be used in the method of this invention and in which R is an alkyl group of one to four carbon atoms include methanol, ethanol, n-propanol, isopropanol, n-butanol, sec-butanol and tert-butanol. The 2-alkoxy-ethyl alcohols ROCH$_2$CH$_2$OH which can be used in the method of this invention and in which R is an alkyl group of one to four carbon atoms include 2-methoxy-ethanol, 2-ethoxy-ethanol, 2-propoxy-ethanol and 2-butoxy-ethanol. While the propoxy and butoxy groups can be branched, the preferred alcohols are the simple alcohols and 2-methoxy-ethanol and 2-ethoxy-ethanol because the corresponding orthosilicate products are most readily distillable. All of the simple alcohols and alkoxy-ethyl alcohols or glycol ethers employed herein are readily available commercially or can be prepared by methods well known in the art. If desired, more than one type of alcohol can be present to produce mixed species of orthosilicates.

Elemental silicon can be used or combined silicon either as an alloy such as, for example, ferrosilicon, silicon bronze, silicon copper or silicon zirconium or as a chemical compound such as, for example, magnesium silicide. Elemental silicon is preferred, particularly in a continuous reaction system in which any other non-reacting elements simply accumulate. However, some silicon-containing alloys have definite economic advantages based on price and availability.

The silicon or silicon compound is generally available commercially in particles having a maximum dimension of about one inch or more. This type of material is operative in the method of this invention, but reaction time will be much longer than with a powdered silicon or silicon compound. Therefore, the silicon or silicon compound should preferably be in the form of a fine powder such that the particles have a maximum dimension in the range of about 10 to 100 microns, more preferably less than 75 microns. The reaction of this invention can only take place at the surface of the silicon component, whether elemental silicon or combined silicon. Therefore, maximum surface area is desired. The finer the particle size is, the greater is the surface area for a given weight of the silicon component.

The reaction accomplished by the method of this invention is catalyzed by compounds of the general formula R'OCH$_2$CH$_2$OM in which R' is as defined above and M is an alkali metal atom, preferably lithium, potassium or sodium. These compounds are prepared simply by adding the desired alkali metal to the 2-alkoxy-ethyl alcohol as shown below, the exothermic reaction taking place readily with the evolution of hydrogen:

$$2R'OCH_2CH_2OH + 2M \rightarrow 2R'OCH_2CH_2OM + H_2$$

Consequently, as a practical matter, where the reactant with silicon is to be a 2-alkoxy-ethanol, it is preferable that the R' of the catalyst compound is the same as the R of any 2-alkoxy-ethyl alcohol to be reacted with the silicon.

In the method of this invention when using a batch technique, the catalyst and silicon are mixed together in mol ratios of at least about 0.5:1. Although no solvent is necessary, it is preferable that some be present. The resulting mixture is heated in the range of 120° C. to 250° C. As heating continues, the desired alcohol is added at a sufficiently slow rate to maintain the desired pot temperature during addition. The total amount of alcohol added is at least 4 moles per mol of Si, preferably no more than 6 moles per mol of Si. During the reaction as the pot temperature is raised or rises, the alcohol in the system is allowed to reflux. When the reaction is completed as indicated by the cessation of hydrogen evolution, the resulting reaction product is fractionated to isolate the desired orthosilicate.

When using a continuous process, the catalyst and any solvent are mixed in the pot in a mol ratio of about 1:1 to 1:2, and the mixture is heated to about 160° C. Then a mixture of silicon and alcohol in an average mol ratio of about 1:4 is added slowly to the pot while maintaining pot temperature. The system is heated with the alcohol product refluxing until the head temperature indicates the presence of sufficient product to start continuous withdrawal of the alcohol-product mixture, which can then be fractionated.

While the catalyst can be employed in an amount as low as about 0.1 percent by weight based on the total weight of total reacting components, it is preferably used in amounts greater than about 5 percent by weight and can be used in almost as large amounts as its solubility in the system permits. As a general rule, this amounts to about 20 to 30 mol percent of the starting ingredients in the pot in either the batch or continuous process.

The anticipated reactions are:

$$4ROH + Si \rightarrow (RO)_4Si + H_2$$
$$4ROCH_2CH_2OH + Si \rightarrow (ROCH_2CH_2O)_4Si + 2H_2$$

For the reaction of this invention the temperature of the system must be at least 75° C. and as a practical matter must be at least about 120° C. for satisfactory reaction rate. The practical maximum temperature appears to depend on catalyst concentration and any solvent present but in any case is about 250° C. When simple alcohols are used as reactants, the preferred temperature range is about 120° C. to 210° C. When 2-alkoxy-ethyl alcohols are used as reactants, the preferred temperature range is about 150° C. to 250° C.

While the preparations described herein are normally run at atmospheric pressure, increased reaction rates can be accomplished by pressurizing the systems up to about 100 p.s.i.g., making possible the use of increased reaction temperatures. This is of particular importance in the preparation of the methyl and ethyl orthosilicates.

The reaction of this invention appears to have two stages, there being an initiation stage before the optimum reaction rate is reached. The duration of the initiation stage varies with the reactants and temperature. However, it has been found that the presence of a solvent having a boiling point at least as high as the desired orthosilicate product essentially eliminates the initiation stage for the reaction of this invention. According to the teachings of French Pat. No. 2,015,846 (U.S. 3,627,807) referred to above, such solvent had to be the same orthosilicate as the reaction product and had to be at least 70 percent by weight of the total liquid in the starting system. It has now been found that a variety of silicate solvents can be employed, preferably solvents having significantly higher boiling points than the desired orthosilicate products. Such solvents include aryl orthosilicates and polysilicates, alkyl orthosilicates and polysilicates, cycloalkyl orthosilicates and 2-alkoxyethyl orthosilicates, each having higher boiling points than the desired orthosilicate product. The preferred solvents are alkyl orthosilicates and silicate dimers in which each of the alkyl groups contains one to four carbon atoms and 2-alkoxyethyl orthosilicates in which each of the alkoxy groups contains one to four carbon atoms.

Furthermore, it has been discovered that while a high quantity of such solvent is very advantageous in the method of this invention, the subject solvent can be present in amounts less than 70 percent by weight, even in minor amounts, i.e., less than 50 weight percent and as low as about 5 to 25 weight percent of the total starting reaction mixture. Obviously, after reaction has started, there will be an increase in orthosilicate concentration. As a practical matter it should be recognized that too great an amount of solvent can slow the desired reaction due to the law of mass action.

Once a continuous reaction has been satisfactorily started, the reaction rate can be most effectively controlled by controlling the feed rate of silicon and/or alcohol.

The easiest method of separating the desired orthosilicate product from the reaction mixture, especially in the case of the alkyl orthosilicates, 2-methoxy-ethyl orthosilicate and 2-ethoxy-ethyl orthosilicate, is distillation. In view of the fact that the presence of some orthosilicate in the starting mixture can be beneficial as a solvent, separation of the product need not be complete for practical operation of the method of this invention especially in a continuous process. Similarly, as the reaction of this invention proceeds and the reactants are consumed, the reaction rate decreases.

The following examples are illustrative of the best methods presently known to us for practicing this invention.

EXAMPLE I

A solution of sodium ethoxyglycolate

was prepared by adding 28.8 grams of sodium to 708.0 grams of 2-ethoxy-ethyl alcohol. There was then added 20 grams of powdered silicon metal (maximum particle dimension of 74 microns), and the system was heated to about 140° C. The reaction was slow to initiate, taking between 2 and 3 hours from the addition of the silicon. The reaction system was then gradually heated to 170° C. for about 18 hours until hydrogen evolution had stopped. The desired product 2-ethoxy-ethyl orthosilicate was obtained by stripping the resulting product at 1 to 2 mm. Hg absolute pressure to a pot temperature of 170° C. to 180° C. and fractionating the distillate thereby yielding 109.9 grams of product.

The product had the following physical properties:

| | |
|---|---|
| Boiling point ° C./1–2 mm. Hg | 150–152 |
| $d_4^{25}$ g./cc | 1.0025 |
| $n_D^{25}$ | 1.42004 |
| Si as $SiO_2$ (wt. percent): | |
| Theoretical | 15.63 |
| Actual | 15.74 |

From this work and subsequent experiments we know that a faster reaction would be obtained by reducing the sodium ethoxyglycolate concentration from about 30 weight percent to about 5 weight percent based on the total weight of 2-ethoxy-ethyl alcohol and silicon and by then increasing the reaction temperature to about 210–220° C.

EXAMPLE II

A solution of sodium ethoxyglycolate

was prepared by adding 4 grams of sodium to 157 grams of 2-ethoxy-ethyl alcohol. To this solution was added 313 grams of 2-ethoxy-ethyl orthosilicate followed by 11 grams of powdered silicon metal (maximum particle dimension of 74 microns). The system was heated to about 154° C. The desired reaction was thoroughly initiated after about 45 minutes as evidenced by the evolution of hydrogen. After initiation of the reaction the system was heated in the range of 154° to 170° C. for an additional 13.5 hours. The desired product was isolated by distilling off 2-ethoxy-ethyl orthosilicate at 150° to 152° C. head temperature at 1 to 2 mm. Hg absolute pressure. Subtraction of the known weight of 2-ethoxy-ethyl orthosilicate originally added from the weight of distillate showed a yield of 114.8 grams of 2-ethoxy-ethyl orthosilicate produced over the amount initially in the system.

When magnesium silicide Mg$_2$Si is substituted mol per mol for the silicon metal in the above preparation, the reaction is more rapid and similar satisfactory results are obtained.

The results of the above run can also be duplicated with faster reaction by repeating the run using only about 47 grams of pre-prepared 2-ethoxy-ethyl orthosilicate and increasing the temperature as quickly as possible to 210° to 240° C.

EXAMPLE III

The run of Example II was repeated using one gram of sodium, 98 grams of 2-ethoxy-ethyl alcohol, 392 grams of 2-ethoxy-ethyl orthosilicate and 11 grams of the powdered silicon metal. The system was heated in the range of 159° C. to 240° C. for 8 hours. 89.9 grams of the desired product 2-ethoxy-ethyl orthosilicate were distilled off and identified.

Similar results can be obtained using only about 20 grams or, alternatively, 100 grams of pre-prepared 2-ethoxy-ethyl orthosilicate.

EXAMPLE IV

The run of Example III was repeated substituting on a mol per mol basis 2-methoxy-ethyl alcohol for the 2-ethoxy-ethyl alcohol and 2-methoxy-ethyl orthosilicate for the 2-ethoxy-ethyl orthosilicate and limiting the temperature range to 150° to 220° C. The product was identified as 2-methoxy-ethyl orthosilicate by gas-liquid phase chromatography and gave the following physical properties:

Boiling point _____° C./1–2 mm. Hg__ 132–133
$d_4^{25}$ _____g./cc__ 1.054
$n_D^{25}$ _____ 1.41917

Si as SiO$_2$ (wt. percent):
  Theoretical _____ 18.3
  Actual _____ 17.6

EXAMPLE V

When the run of Example III is repeated substituting on a mol per basis 2-propoxy-ethyl alcohol for the 2-ethoxy-ethyl alcohol and 2-propoxy-ethyl orthosilicate for the 2-ethoxy-ethyl orthosilicate, the product is 2-propoxy-ethyl orthosilicate.

EXAMPLE VI

A solution of potassium ethoxyglycolate was prepared by adding 3.9 grams of potassium to 70 grams of 2-ethoxy-ethyl alcohol and 196 grams of 2-ethoxy-ethyl orthosilicate. Upon completion of this reaction 28 grams of powdered silicon metal (maximum particle dimension of 74 microns) was added to the reaction mixture, and the mixture was then heated to 200° C. A dropwise addition of 313 grams of 2-ethoxy-ethyl alcohol was then made over a period of 6.5 hours at a temperature ranging from 190° to 216° C. After this addition was complete, the system was maintained in this temperature range for an additional 5 hours at the end of which the evolution of hydrogen gas had practically stopped. The reaction mixture was stripped at 1 to 2 mm. Hg absolute pressure at 60° to 154° C. head temperature. The distillate was then fractionated yielding 2-ethoxy-ethyl orthosilicate at 150° to 152° C. head temperature at 1 to 2 mm. Hg absolute pressure. There was 217.5 grams of product in addition to the original 2-ethoxy-ethyl orthosilicate starting material.

When the above run is repeated and lithium is substituted on a mol per mol basis for the potassium, similar results are obtained.

EXAMPLE VII

When the run of Example IV is repeated in the presence of pre-prepared 2-ethoxy-ethyl orthosilicate instead of pre-prepared 2-methoxy-ethyl orthosilicate in the same amount, similar results are obtained as the results of Example IV.

EXAMPLE VIII

Twenty grams of silicon powder (10–100 micron particle size) were added to 500 gms. of a 29.5 weight percent catalyst solution of sodium ethoxyglycolate in monoethyl ether of ethylene glycol in a 1 liter flask equipped with a stirrer, column, thermometer, condenser and receiver. The reaction mixture was heated to 145° C. at which temperature the reaction mixture began refluxing. Hydrogen evolution was slow at first but improved as the tetra-2-ethoxy-ethyl silicate concentration and reaction temperature increased. After reaction temperature reached 165° C., refluxing was continued for 14 hours. The reaction mixture product was vacuum distilled, and the distilled product was then redistilled, producing 146 grams, of tetra-2-ethoxy-ethyl orthosilicate having a boiling point of 156° C. at 1–2 mm. of Hg. This represents a yield of 56% of theoretical based upon silicon used.

EXAMPLE IX

In the following example the equipment described in Example VIII was used with the exception that an addition funnel for addition of methyl alcohol to the reaction was added.

Forty grams of silicon powder (10–100 microns) was added to a solution of 120 grams of a mixture of sodium 2-ethoxyglycolate and potassium 2-ethoxyglycolate in an equimolar ratio in 45 grams of 2-ethoxyethanol and 242 grams tetra-2-ethoxy-ethyl orthosilicate. Methyl alcohol was added at a rate so as to maintain a pot temperature between 128° C. to 133° C. The reaction was run for a period of six hours during which time 217.4 grams of distillate was collected. The material remaining in the reaction flask was distilled under vacuum to a pot temperature of 204° C. at 5–6 mm. Hg. The distillates were combined and fractionated for methyl silicate. There was obtained 80.5 grams of tetramethyl orthosilicate with a boiling point of 120° C. to 122° C. This represents a yield of 42% of theoretical based on silicon used.

EXAMPLE X

Using the equipment described in Examples VIII and IX, 225 grams of tetra-2-ethoxy-ethyl orthosilicate were added to a catalyst solution of a mixture of 0.9 gm.-mole of sodium ethoxyglycolate and 0.1 gm.-mole of potassium ethoxyglycolate in 45 grams of monoethyl ether of ethylene glycol. 28 grams of silicon powder (10–100 micron particle size) were added to the above reaction mixture (with stirring), and the temperature of the reaction was raised to 170° C. A 20 weight percent slurry of silicon powder (10–100 micron size) in ethanol was added as needed to maintain reaction temperature. The reaction was run for eight hours during which time 680 milliliters of tetraethyl orthosilicate-ethanol mixture was obtained. Upon distillation of the mixture there was obtained 336 grams of tetraethyl orthosilicate with a boiling point of 166–168° C. This represents 42 grams of product per hour.

EXAMPLE XI 225 grams of tetra-cyclohexyl orthosilicate and 28 grams of silicon powder (10–100 micron size) were added to 166.9 grams of the catalyst solution described in Example X. The reaction apparatus was the same as that described in Examples VIII and IX. The temperature of the reaction mixture was raised to 180° C., and the 20 weight percent silicon-in-ethanol slurry of Example X was continuously added to the reaction mixture. Hydrogen evolution began at 150° C. and increased as the temperature was increased. The silicon-ethanol slurry was added to the reaction mixture over a period of 9 hours at an average rate of 85 milliliters per hour. 790 milliliters of an ethanol-ethyl orthosilicate mixture was obtained and redistilled for product. There was obtained 440.5 grams of ethyl orthosilicate, representing 48.8 grams ethyl orthosilicate per hour, with a boiling point 166–168° C.

EXAMPLE XII 225 grams of hexaethoxydisiloxane and 56 grams of silicon powder (10 to 100 microns) were added to a one liter flask containing 37.9 gms. (⅓ gm.-mole) of the catalyst described in Example X. The reaction apparatus, which was designed for making organo silicates continuously, consisted of a one liter flask equipped with a stirrer, pot thermometer, column, condenser, partial take-off valve (for continuously removing product) and a common return tube extending below the surface of the reaction mixture for simultaneous return of the reflux mixture and addition of an alcohol-silicon slurry. The temperature of the reaction mixture was raised to 170° C. and a slurry of 14 weight percent silicon in ethanol was continuously added to the reaction mixture from a mixing chamber equipped with stirrer, metering pump for alcohol and an opening for charging the silicon powder. Hydrogen evolution began at 140° C. and continued throughout the reaction. The addition of the silicon-ethanol slurry was made over a period of six hours at an average rate of 120 milliliters per hour. The product mixture was removed at a head temperature of 148° C. to 155° C. The distillate was then redistilled, and 318 grams of ethyl silicate was obtained with a boiling point of 166° to 168° C. and $n_D^{25}$ of 1.3823. This represents a yield of 53 grams per hour.

EXAMPLE XIII 100 grams of tetraphenyl orthosilicate were added to 79.4 grams of a catalyst solution consisting of 0.45 gram-mole of sodium ethoxyglycolate and 0.05 gram-mole of potassium ethoxyglycolate in monoethyl ether of ethylene glycol using the apparatus described in Examples VIII and IX. An exotherm occurred upon addition of the tetraphenyl orthosilicate to the catalyst, and a solid formed which melted at a temperature of 150° C. At this point 28 grams of silicon powder (10–100 micron particle size) were added to the reaction mixture, and the reaction temperature increased to 170° C. Ethanol addition was started, and a slow hydrogen evolution began. After ½ hour hydrogen evolution had stopped. The temperature was increased to 190° C., but no further hydrogen was evolved. The material in the flask was stripped under vacuum to a pot temperature of 220° C. at 5 mm. Hg. The distillate was then analyzed by gas chromatograph and found to contain 7% ethyl orthosilicate.

EXAMPLE XIV

Using the equipment described in Example VIII, 16 grams of Ferro Silicon (90% silicon by weight) having a particle size of 10–100 microns were added to a solution of 67.0 gms. of sodium ethoxyglycolate and 7.4 gms. of potassium ethoxyglycolate in 100 gms. of tetra-2-ethoxy-ethyl silicate. The reaction temperature was raised to 170° C., and 110 milliliters of ethyl alcohol was added dropwise from an addition funnel. The reaction was run for 5 hours at a head temperature of 150° C. to 155° C. Following completion of the reaction as indicated by the slowing down of hydrogen evolution, the reaction was distilled, first at atmospheric pressure and finally under reduced pressure. The distillates were then combined and redistilled for ethyl orthosilicate with a boiling point range of 160°–167° C. The yield of product was 48.6 grams representing a yield of 60 percent of theoretical based on silicon used.

We claim:
1. A method of making alkyl and/or 2-alkoxy-ethyl orthosilicates comprising
   (1) reacting at a temperature of from 120° C. to 250° C. (A) at least one alcohol selected from the group consisting of ROH and ROCH$_2$CH$_2$OH in which each R is an alkyl group containing from one to four carbon atoms with (B) silicon, the molar ratio of A to B in the reaction being 4:1, in contact with at least 0.1 percent by weight based on the combined weight of A and B of (C) at least one compound of the general formula R'OCH$_2$CH$_2$OM, in which R' is an alkyl group of from one to four carbon atoms and M is an alkali metal atom, for a time sufficient to effect reaction of A and B and
   (2) isolating the desired product from the reaction mixture.
2. The method of claim 1 wherein the silicon is present in essentially a powder form the particle size of which has a maximum dimension of no more than about 100 microns.
3. The method of claim 2 wherein the temperature range is no higher than 220° C. and each R is methyl or ethyl.
4. The method of claim 3 wherein reaction step (1) takes place in contact with (D) a silicate solvent having a boiling point higher than said desired product, said solvent D being present in an amount equal to at least 5 percent by weight based on the combined weight of A, B and C.
5. The method of claim 4 wherein catalyst C is present in an amount from about 5 to 30 percent by weight based on the total weight of A and B.
6. The method of claim 5 wherein solvent D is selected from the group consisting of alkyl orthosilicates and silicate dimers in which each alkyl group contains from one to four carbon atoms and 2-alkoxy-ethyl orthosilicates in which each alkoxy group contains one to four carbon atoms.
7. The method of claim 6 wherein solvent D is an alkyl orthosilicate other than the desired product.
8. The method of claim 6 wherein components A and B are reacted continuously in a molar ratio of 4:1 and the desired orthosilicate product is continuously isolated from the reaction mixture.
9. The method of claim 6 wherein component C is a mixture of at least two compounds such that up to 10% of the M atoms are potassium atoms and the remainder of the M atoms are sodium.

References Cited

UNITED STATES PATENTS

| 3,627,807 | 12/1971 | Bleh et al. | 260—448.8 A |
| 2,927,937 | 3/1960 | Gaines | 260—448.8 A |

DANIEL E. WYMAN, Primary Examiner

P. F. SHAVER, Assistant Examiner

U.S. Cl. X.R.

260—448.8 R